United States Patent Office 2,899,455
Patented Aug. 11, 1959

2,899,455

DERIVATIVES OF 2,2-DIMETHYL-1,3-PROPANE-DIOL CYCLIC HYDROGEN PHOSPHITE

Harry W. Coover, Jr., and Richard L. McConnell, Kingsport, Tenn., assignors to Eastman Kodak Company, Rochester, N.Y., a corporation of New Jersey No Drawing. Application August 24, 1956
Serial No. 605,926

8 Claims. (Cl. 260—461)

This invention relates to new compositions of matter and to their preparation. In one of its aspects it relates to new organophosphorus derivatives of 2,2-dimethyl-1,3-propanediol cyclic hydrogen phosphite.

An object of this invention is to prepare novel organophosphorus derivatives of 2,2-dimethyl-1,3-propanediol cyclic hydrogen phosphite. Another object is to provide a method for preparation of said new organophosphorus compounds. Still another object is to provide novel phosphonates useful as pesticides, plasticizers, solvents, flame-proofing agents and as intermediates in the preparation of other organic compounds. These and other objects will be apparent from the description and claims which follow.

The novel compounds of the invention are characterized by the formulas:

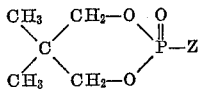

and

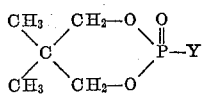

wherein Z is a moity derived from a compound represented by the formula selected from the group consisting of

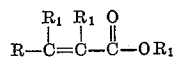

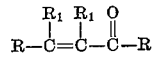

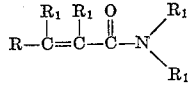

wherein R is selected from the group consisting of hydrogen, aliphatic hydrocarbon groups containing from 1 to 4 carbon atoms, and aromatic hydrocarbon groups containing from 6 to 9 carbon atoms, and $R_1$ is selected from the group consisting of hydrogen and aliphatic hydrocarbon groups containing from 1 to 4 carbon atoms, and wherein Y is a moiety derived from an aldehyde represented by the general formula:

wherein $R_2$ is selected from the group consisting of aliphatic hydrocarbon groups containing 1 to 4 carbon atoms and aromatic hydrocarbon groups containing 6 to 9 carbon atoms.

These compounds are the reaction products produced by the reaction of 2,2-dimethyl-1,3-propanediol cyclic hydrogen phosphite with aldehydes, both saturated and unsaturated, and α,β-unsaturated esters, amides, nitriles and ketones. The reaction involved may be characterized as an addition reaction. When an aldehyde is chosen as one of the reactants, the reaction proceeds with the phosphorus atom of the cyclic hydrogen phosphite adding to the carbonyl carbon of the aldehyde, producing α-hydroxy phosphonates, such as that illustrated by the following formula:

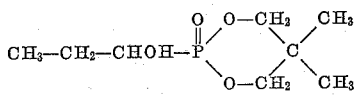

When an α,β-unsaturated compound, as listed above, is chosen as one of the reactants, the reaction proceeds with the phosphorus atom of the cyclic hydrogen phosphite adding across the α—β double bond, producing conjugate addition products, such as that illustrated by the following formula:

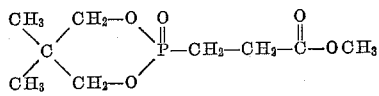

Typical of the aldehydes which may be used in the practice of this invention are formaldehyde, acetaldehyde, propionaldehyde, butyraldehyde, isobutyraldehyde, chloroacetaldehyde, dichloroacetaldehyde, chloral, acrolein, crotonaldehyde, cinnamaldehyde, benzaldehyde, and chloro- or nitro-substituted benzaldehydes. The α,β-unsaturated compounds which may be used include methyl methacrylate, ethyl methacrylate, butyl methacrylate, phenyl methacrylate, methyl acrylate, ethyl acrylate, propyl acrylate, isobutyl acrylate, phenyl acrylate, acrylamide, N-methylacrylamide, N-ethylacrylamide, N-isopropylacrylamide, N-butylacrylamide, N-phenylacrylamide, N,N-dimethylacrylamide, N,N-diethylacrylamide, N,N-dipropylacrylamide, N-methylmethacrylamide, N-isopropylmethacrylamide, N-isobutylmethacrylamide, N,N-dimethylmethacrylamide, N,N-diethylmethacrylamide, N,N-dibutylmethacrylamide, crotonamide, methyl vinyl ketone, ethyl vinyl ketone, butyl vinyl ketone, methyl propenyl ketone, acrylonitrile, methacrylonitrile, and crotononitrile.

A preferred method of producing the compounds of the invention utilizes basic catalysts and is carried out under reaction temperatures ranging between —25 and 150° C. Tertiary amines, such as trimethyl-, triethyl-, tributyl-amines, alkali metal alkoxides such as sodium or potassium ethoxide, sodium or potassium methoxide, alkali metal amides such as sodium or potassium amide and alkali metal phosphites such as sodium or potassium phosphite are particularly effective catalysts in the production of said compounds. However, it is to be noted that when strong negatively substituted aldehydes such as chloral are employed, no catalyst is required. In general, the reaction may be carried out without the use of a solvent. The reactions carried out under such conditions are usually complete within a few minutes and the yields of the crude product are almost quantitative.

2,2-dimethyl-1,3-propanediol cyclic 2,2-dichlorovinyl phosphate is produced as one embodiment of the invention by the dehydrochlorination of 2,2-dimethyl-1,3-propanediol cyclic 1-hydroxy-2,2,2-trichloroethylphosphonate with an alkali such as sodium or potassium hydroxide. The reaction proceeds as follows:

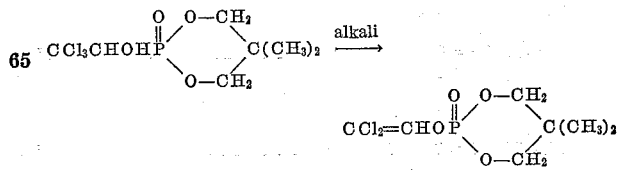

A particularly valuable utilization of the compounds of the invention is found in their employment as plasticizers. Their utility in this regard is illustrated by the following example wherein cellulose acetate containing 2,2-dimethyl-1,3-propanediol cyclic 2-cyanoethylphosphonate was roll compounded and compression molded into transparent plastic sheets. The plasticizer did not exude as the plastic aged. Commercially useful plastic product was produced; and it is to be noted that the thin plastic sheets so produced were self extinguishing as determined by ASTM Method D635-44 (that is, in illustration of the flame-proofing property of the compound). Similar tests were carried out utilizing 2,2-dimethyl-1,3-propanediol cyclic 2-carbomethoxypropylphosphonate, 2,2-dimethyl-1,3-propanediol cyclic N-isopropylcarbamidoethylphosphonate, said compounds giving similar plasticizing and flame-proofing action when used in cellulose acetate.

It has also been found that the compounds of the invention are extremely valuable when employed as insecticides. The following is illustrative of this aspect:

Data on flies were obtained by a topical application method. The toxicant was dissolved in acetone at the desired concentration and applied with a hypodermic syringe. The accurately measured amounts were determined by a micrometer which was set to deliver 1 microliter of the toxicant solution on the mid-thoracic point of each of 20 four-day-old female flies. These flies were carefully separated from the males under a carbon dioxide anesthesia since females give more reproducible testing results. After treatment they were placed in small cylindrical recovery cages and observed 24 hours later for mortality. It should be noted that flies which were treated with 1 microliter of pure acetone were not killed. This is the blank run referred to in Table I.

TABLE I

| Toxicant | Insect | Toxicant Concentration, Percent | Kill, Percent |
|---|---|---|---|
| Blank | Mosquito | 0 | 0 |
| CCl₃CHOHP(=O)(OCH₂)₂C(CH₃)₂ (OCH₃) | do | 0.1 | 100 |
| CCl₃CHOHP(=O)(OCH₂)₂C(CH₃)₂ | do | 0.01 | 50 |
| CCl₂=CHOP(=O)(OCH₂)₂C(CH₃)₂ | do | 0.1 | 100 |
| CCl₂=CHOP(=O)(OCH₂)₂C(CH₃)₂ | do | 0.01 | 100 |
| Blank | Fly | 0 | 0 |
| CCl₂=CHOP(=O)(OCH₂)₂C(CH₃)₂ | do | 1.0 | 100 |
| CCl₂=CHOP(=O)(OCH₂)₂C(CH₃)₂ | do | 0.1 | 75 |
| CCl₂=CHOP(=O)(OCH₂)₂C(CH₃)₂ | do | 0.03 | 15 |
| CCl₂=CHOP(=O)(OCH₂)₂C(CH₃)₂ | do | 0.01 | 5 |

Data on mosquitoes were obtained in the following manner: Solutions of the candidate compounds were made up in acetone at a concentration of 1.0% and diluted in water to the desired testing concentration. Ten third instar larvae of *C. quinquifasciatus* were removed from larval rearing pans and placed in the solution. After 24 hours, the dead larvae were counted. It should be noted that dilute solutions of acetone in water do not kill the larvae. This is the blank run referred to in Table I.

The following examples will further illustrate and describe the invention. All amounts are in parts-by-weight unless otherwise indicated.

*Example 1.—2,2-dimethyl-1,3-propanediol cyclic 1-hydroxy-2,2,2-trichloroethylphosphonate*

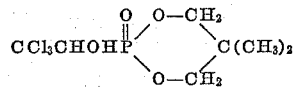

Chloral (14.7 parts by wt.) and 2,2-dimethyl-1,3-propanediol cyclic hydrogen phosphite (15.0 parts by wt.) were mixed in a flask which was cooled externally with ice water. Within a few seconds the temperature of the reaction mixture rose to 120° C. and it solidified to a white mass. After recrystallization from ethyl alcohol, transparent, square platelets were obtained which melted at 209–210° C. This compound was extremely effective in killing flies and mosquitoes at concentrations of 1.0% and 0.1%, respectively.

*Example 2.—2,2-dimethyl-1,3-propanediol cyclic 2,2-dichlorovinyl phosphate*

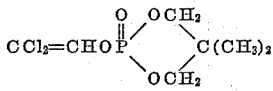

29.8 g. of 2,2-dimethyl-1,3-propanediol cyclic 1-hydroxy-2,2,2-trichloroethylphosphonate was dissolved in 200 ml. of absolute ethyl alcohol and stirred vigorously while a solution of 5.6 g. of potassium hydroxide in 100 ml. of absolute ethyl alcohol was added dropwise. The temperature rose to about 35° C. After all of the potassium hydroxide solution had been added, the reaction mixture was refluxed gently on the steam bath for 3 hours. After the reaction mixture had cooled to 25° C., the precipitated potassium chloride was filtered off. Evaporation of the solvent gave a good yield of a viscous, light yellow oil. In addition to dehydrochlorination, the potassium hydroxide caused rearrangement of the phosphonate to a phosphate structure. The dichlorovinyl phosphate structure was verified by infrared analysis. This product was quite effective in killing flies and can be used in the usual manner. It may be applied either as a dust or spray.

*Example 3.—2,2-dimethyl-1,3-propanediol cyclic 1-hydroxy-1-(p-chlorophenyl) methylphosphonate*

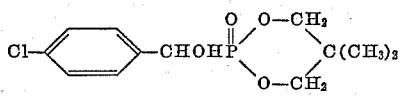

This hydroxyphosphonate was prepared from 14.1 g. of p-chlorobenzaldehyde and 15.0 g. of 2,2-dimethyl-1,3-propanediol cyclic hydrogen phosphite using a few drops of triethylamine as the catalyst. After the reaction mixture was heated on a steam bath with stirring for 1 hr., it was placed under reduced pressure (1–2 mm. at 25° C.) to remove the catalyst.

*Example 4.—2,2-dimethyl-1,3-propanediol cyclic 1-hydroxy-1-(p-nitrophenyl) methylphosphonate*

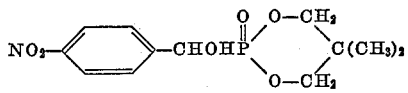

This product was prepared from 15.1 g. of p-nitrobenzaldehyde, 15.0 g. of 2,2-dimethyl-1,3-propanediol cyclic hydrogen phosphite and 5 drops of triethylamine according to the procedure of Example 3.

*Example 5.—2,2-dimethyl-1,3-propanediol cyclic 2-cyanoethylphosphonate*

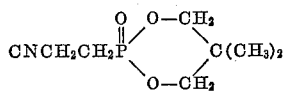

A few drops of a concentrated solution of sodium ethoxide were added with stirring to a mixture of 5.3 g. of acrylonitrile and 15.0 g. of 2,2-dimethyl-1,3-propanediol cyclic hydrogen phosphite. The reaction was exothermic and was moderated by means of an ice bath. The crude product was a light yellow oil which was purified by distillation at reduced pressure.

*Example 6.—2,2-dimethyl-1,3-propanediol cyclic 2-carbomethoxypropylphosphonate*

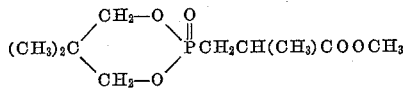

This phosphonate was prepared from 10.0 g. of methyl methacrylate and 15.0 g. of 2,2-dimethyl-1,3-propanediol cyclic hydrogen phosphite according to the procedure of Example 5.

*Example 7.—2,2-dimethyl-1,3-propanediol cyclic N-isopropylcarbamidoethylphosphonate*

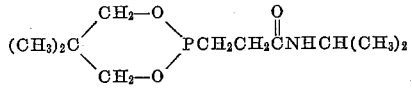

This phosphonate was prepared from 11.3 g. of N-isopropylacrylamide and 15.0 g. of 2,2-dimethyl-1,3-propanediol cyclic hydrogen according to the procedure of Example 5.

*Example 8.—2,2-dimethyl-1,3-propanediol cyclic 1-hydroxyethylphosphonate*

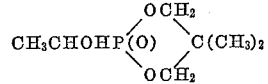

This hydroxyphosphonate was prepared from 4.4 g. of acetaldehyde, 15.0 g. of 2,2-dimethyl-1,3-propanediol cyclic hydrogen phosphite, and 5 drops of triethylamine according to the procedure of Example 3.

*Example 9.—2,2-dimethyl-1,3-propanediol cyclic 1-hydroxy-2-methylpropylphosphonate*

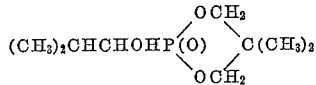

This hydroxyphosphonate was prepared from 7.2 g. of isobutyraldehyde, 15.0 g. of 2,2-dimethyl-1,3-propanediol cyclic hydrogen phosphite, and a few drops of tributylamine according to the procedure of Example 3.

*Example 10.—2,2-dimethyl-1,3-propanediol cyclic 2-cyano-2-methylethylphosphonate*

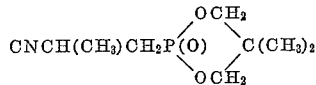

This compound was prepared from 6.7 g. of methacrylonitrile and 15.0 g. of 2,2-dimethyl-1,3-propanediol cyclic hydrogen phosphite according to the procedure of Example 5.

*Example 11.—2,2-dimethyl-1,3-propanediol cyclic 2-carbethoxyethylphosphonate*

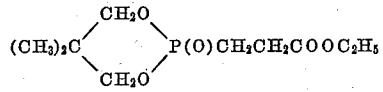

This product was prepared from 20.0 g. of ethyl acrylate and 30.0 g. of 2,2-dimethyl-1,3-propanediol cyclic hydrogen phosphite according to the procedure of Example 5.

*Example 12.—2,2-dimethyl-1,3-propanediol cyclic 2-carbisobutoxyethylphosphonate*

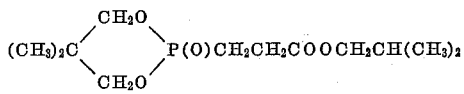

This compound was prepared from 12.8 of isobutyl acrylate and 15.0 g. of 2,2-dimethyl-1,3-propanediol cyclic hydrogen phosphite according to the procedure of Example 5.

*Example 13.—2,2-dimethyl-1,3-propanediol cyclic carbamidoethylphosphonate*

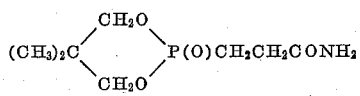

This compound was prepared from 7.1 g. of acrylamide and 15.0 g. of 2,2-dimethyl-1,3-propanediol cyclic hydrogen phosphite according to the procedure of Example 5.

*Example 14.—2,2-dimethyl-1,3-propanediol cyclic 2-(N,N-dimethylcarbamido)-propylphosphonate*

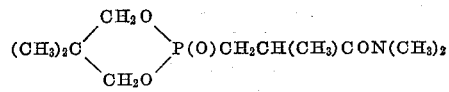

This product was prepared from 11.3 g. of N,N-dimethylmethacrylamide and 15.0 g. of 2,2-dimethyl-1,3-propanediol cyclic hydrogen phosphite according to the procedure of Example 5.

*Example 15.—2,2-dimethyl-1,3-propanediol cyclic 3-oxobutylphosphonate*

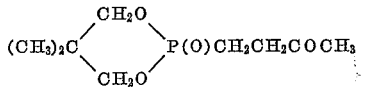

This compound was prepared from 7.0 g. of methyl vinyl ketone and 15.0 g. of 2,2-dimethyl-1,3-propanediol cyclic hydrogen phosphite according to the procedure of Example 5.

*Example 16.—2,2-dimethyl-1,3-propanediol cyclic 1-methyl-3-oxobutylphosphonate*

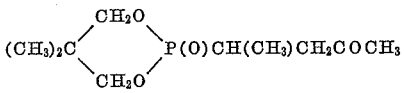

This compound was prepared from 8.4 g. of methyl propenyl ketone and 15.0 g. of 2,2-dimethyl-1,3-propanediol cyclic hydrogen phosphite according to the procedure of Example 5.

Although the invention has been described in considerable detail with particular reference to certain preferred embodiments thereof, variations and modifications can be effected within the spirit and scope of the invention as described hereinabove, and as defined in the appended claims.

We claim:

1. As a composition of matter, 2,2-dimethyl-1,3-propanediol cyclic 1-hydroxy-2,2,2-trichloroethylphosphonate,

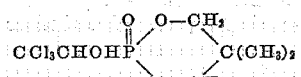

2. As a composition of matter, 2,2-dimethyl-1,3-propanediol cyclic 2,2-dichlorovinyl phosphate,

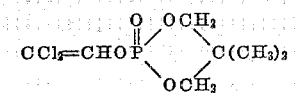

3. As a composition of matter, 2,2-dimethyl-1,3-propanediol cyclic 1-hydroxy-1-(p-nitrophenyl) methylphosphonate,

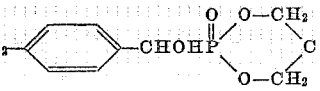

4. As a composition of matter, 2,2-dimethyl-1,3-propanediol cyclic 2-cyanoethylphosphonate,

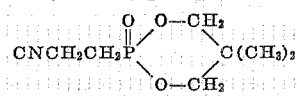

5. As a composition of matter, 2,2-dimethyl-1,3-propanediol cyclic N-isopropylcarbamidoethylphosphonate,

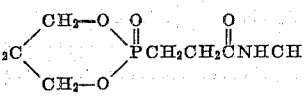

6. The method for producing new organophosphorus compounds which comprises reacting 2,2-dimethyl-1,3-propanediol cyclic hydrogen phosphite with a compound represented by the formulas:

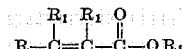
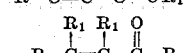
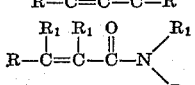

and

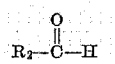

wherein R is selected from the group consisting of hydrogen, lower alkyl and phenyl, $R_1$ is selected from the group consisting of hydrogen and lower alkyl and $R_2$ is selected from the group consisting of lower alkyl, phenyl, chlorophenyl and nitrophenyl, at a temperature within the range of $-25$ to $150°$ C.

7. The organophosphorus compounds having the structural formula:

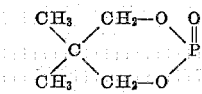

wherein Z is a radical having a carbon atom attached directly to the phosphorus atom in said structural formula and selected from the group consisting of

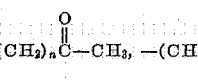

$-(CH_2)_nCOOR$, $-(CH_2)_nCN$ and $-CHOHR_1$ wherein $R_1$ is selected from the group consisting of trichloromethyl, chlorophenyl, nitrophenyl and lower alkyl, $n$ being an integer of 1 to 4 and R being a lower alkyl radical.

8. The organophosphorus compounds having the structural formula:

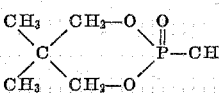

wherein $R_1$ is selected from the group consisting of trichloromethyl, chlorophenyl, nitrophenyl and lower alkyl.

References Cited in the file of this patent
UNITED STATES PATENTS
2,744,128    Morris et al.    May 1, 1956

OTHER REFERENCES

Arbuzov et al.: "Chemical Abstracts," vol. 45, col. 1512–3 (1951).